United States Patent
Moestam et al.

(10) Patent No.: US 10,876,499 B2
(45) Date of Patent: Dec. 29, 2020

(54) PURGE EJECTOR ASSEMBLY FOR A VEHICLE

(71) Applicant: Ningbo Geely Automobile Research & Development Co., Ltd., Ningbo (CN)

(72) Inventors: Robert Moestam, Växjö (SE); Erik Fredholm, Billdal (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 16/679,175

(22) Filed: Nov. 9, 2019

(65) Prior Publication Data

US 2020/0072167 A1 Mar. 5, 2020

Related U.S. Application Data

(63) Continuation of application No. PCT/CN2018/085117, filed on Apr. 28, 2018.

(30) Foreign Application Priority Data

May 18, 2017 (EP) ..................... 17171712

(51) Int. Cl.
*F02M 25/08* (2006.01)
*F02M 35/10* (2006.01)

(52) U.S. Cl.
CPC .... *F02M 25/0836* (2013.01); *F02M 25/0854* (2013.01); *F02M 25/0872* (2013.01); *F02M 35/10222* (2013.01)

(58) Field of Classification Search
CPC .......... F02M 25/0836; F02M 25/0854; F02M 25/0872; F02M 35/10222
USPC ....................................... 123/519
See application file for complete search history.

(56) References Cited

U.S. PATENT DOCUMENTS

| | | |
|---|---|---|
| 2011/0146631 A1 | 6/2011 | Konohara et al. |
| 2014/0196694 A1 | 7/2014 | Euliss et al. |
| 2015/0096541 A1 | 4/2015 | Edmund et al. |
| 2015/0159601 A1 | 6/2015 | Luehrsen et al. |
| 2017/0096969 A1* | 4/2017 | Gerbig ............... F02M 25/0836 |

FOREIGN PATENT DOCUMENTS

| | | |
|---|---|---|
| CN | 102192056 A | 9/2011 |
| CN | 104989514 A | 10/2015 |
| CN | 105464845 A | 4/2016 |
| DE | 102014210508 A1 | 12/2015 |
| JP | 6112046 B2 | 4/2017 |

OTHER PUBLICATIONS

International Search Report and Written Opinion from corresponding International Patent Application No. PCT/CN2018/085117, dated Jul. 31, 2018, 10 pages.
Extended European Search Report from corresponding European Patent Application No. 17171712.7, dated Aug. 30, 2017, 5 pages.

* cited by examiner

*Primary Examiner* — Mahmoud Gimie (74) *Attorney, Agent, or Firm* — Tucker Ellis LLP (57) ABSTRACT

A purge ejector assembly for a vehicle. A second fluid passage extends into a first fluid passage so that a nozzle opening is arranged inside the first fluid passage facing an air channel flow port such that a flow of air in the first fluid passage flows around the nozzle opening, and wherein a flow shape unit is disposed within the first fluid passage in connection to the nozzle opening.

17 Claims, 5 Drawing Sheets

PURGE EJECTOR ASSEMBLY FOR A VEHICLE

RELATED APPLICATION DATA

This application is a continuation of International Patent Application No. PCT/CN2018/085117, filed Apr. 28, 2018, which claims the benefit of EP 17171712.7, filed May 18, 2017, the disclosures of which are incorporated herein by reference in their entireties.

TECHNICAL FIELD

The present disclosure relates to a purge ejector assembly for a vehicle, where the purge ejector assembly is typically implemented in a vehicle fuel system or in a vehicle engine system. The disclosure further relates to an evaporation fuel purge system comprising a purge ejector assembly, a method for ejecting evaporated fuel, and a vehicle comprising a purge ejector assembly.

Although the disclosure will be described in relation to a car, the disclosure is not restricted to this particular vehicle, but may as well be installed in other type of vehicles such as minivans, recreational vehicles, off-road vehicles, and heavy-duty vehicles, such as trucks, buses and construction equipment.

BACKGROUND ART

Vehicle engines, in particular petrol fuel-powered combustion engines but also other engines, are typically connected to a fuel system including a fuel tank and other components, such as for example a fuel pump and fuel lines, configured to provide fuel to the engine or the engine system. A majority of these systems also include a so called fuel evaporation purge (EVAP) system for preventing fuel vapor in the fuel tank from escaping into the atmosphere. In this context, it should be noted that a fuel system is typically not allowed to leak more fuel vapor in the atmosphere than legislations permit.

The EVAP system is generally configured to trap fuel vapor from the fuel tank and temporarily store them in a charcoal canister. When the vehicle engine is running under certain conditions, the fuel vapor is purged from the canister and burned inside the engine. The canister needs to be drained of hydrocarbons to make sure that emissions are still kept to a satisfied level. In order to determine when the canister should be emptied, the EVAP system may also include a purge valve or other control mechanisms adapted to control the amount of fuel vapor intended to be purged from the charcoal canister. In many vehicles, such as for example modern cars, the purge valve is controlled by the engine computer. When the engine is off, the purge valve is closed. When the engine is running and fully warmed up, the engine computer gradually opens the purge valve to permit some amount of fuel vapor to be transferred from the charcoal canister to the engine.

Some systems may include a purge ejector assembly to further improve the process of emptying the canister in an efficient way, which may operate both during low pressure and boost pressure conditions of the vehicle's engine. A purge ejector system may be designed in several different ways, and includes a purge ejector and one or several valves to control the flow of fuel vapor between the components making up the EVAP system and the engine system.

However, current regulatory conditions in the automotive market have led to an increasing demand to improve the process of purging fuel vapor from the canister to the engine in present vehicles. Further, with increased attention to environmental problems, fuel vapor regulations are becoming more and more stringent. These regulatory conditions must be balanced with the demands on the engine system for high performance of a vehicle. These problems and demands are particularly apparent for engine systems having a compressor, such as for example a turbocharger.

There are several different solutions to arrange the purge ejector in the fluid passage between the canister and the engine system, which solutions partly depend on the design of the engine system and the EVAP system.

It would be beneficial if it could be ensured that the purge ejector or the purge ejector assembly for the engine can be installed in a known or commercially available vehicle without substantial changes to the fuel system or the EVAP system, while enabling an effective purge of the canister during operation of the engine system. Further, it is also desired to have a purge ejector solution having a high efficiency during both low pressure and boost pressure conditions of the engine in order to minimize the energy used to purge the fuel vapors from the canister.

SUMMARY OF THE INVENTION

An object of the present disclosure is to provide an improved purge ejector assembly for a vehicle, a fuel evaporation purge system, and a method for ejecting evaporated fuel, where the previously mentioned problems are avoided. In particular, an object of the present disclosure is to provide a purge ejector assembly for an engine capable of controlling the process of emptying a canister of a vehicle fuel system during various engine conditions, for example during idle as well as during boost pressure in the driving cycles of the vehicle. This object is at least partly achieved by the features of the independent claims. The dependent claims contain further developments of the purge ejector assembly.

By providing a purge ejector assembly including a configuration as mentioned above, it becomes possible to improve existing operations of the fuel system. In particular, the present invention provides a purge ejector assembly capable of controlling the purge flow both when the engine is operated under low pressure and boost pressure conditions. In this manner, the purge ejector assembly is capable of controlling the process of emptying the canister of a vehicle fuel system during various engine conditions, i.e. during idle at the driving cycles as well as during boost pressure at the driving cycles. This may be particularly important for vehicles with small engine displacement and so called stop/start functions as well as for vehicles with hybrid engines. The advantages described above are also believed to further contribute to better meet prevailing regulations with regards to exhaust and fuel emissions. As such, the example embodiments of the present disclosure are capable of improving the general performance of the purge ejector assembly.

The disclosure concerns a purge ejector assembly for a vehicle, comprising a first fluid passage having an engine flow port and an air channel flow port in fluid communication with each other; a second fluid passage connected to the first fluid passage, the second fluid passage having a purge flow port arranged outside the first fluid passage and a nozzle opening, where the purge flow port and the air channel flow port are in fluid communication with each other, wherein the purge flow port is connectable to a canister purge passage enabling evaporated fuel to flow in the second fluid passage from the canister purge passage via the purge flow port to the air channel flow port. The purge ejector assembly further comprises a flow shape unit disposed within the first fluid passage between the engine flow port and the air channel flow port, where the flow shape unit is configured to raise the flow velocity of air flowing in a direction from the engine flow port to the air channel flow port when a first pressure level is applied to the engine flow port, thereby subjecting the second fluid passage to a second pressure level, which is lower than the first pressure level. The second fluid passage is extending into the first fluid passage so that the nozzle opening is arranged inside the first fluid passage facing the air channel flow port such that the flow of air in the first fluid passage is flowing around the nozzle opening, and wherein the flow shape unit is disposed within the first fluid passage in connection to the nozzle opening.

Advantages with these features are that, with this type of purge ejector assembly, fuel vapors can be efficiently purged from the canister. The flow established around the nozzle opening will create a low second pressure level that sucks out the fuel vapors, where at the same time the energy consumption needed for the flow of air in the first fluid passage is low. Further, the purge ejector assembly can be installed in a known or commercially available vehicle without substantial changes to the fuel system or the EVAP system, while enabling an effective purge of the canister during operation of the engine system.

According to an aspect of the disclosure, the flow of air in the first fluid passage is flowing around the nozzle opening along an inner wall of the first fluid passage. In this way, the flow is efficiently distributed in the purge ejector assembly for an efficient withdrawal of fuel vapors from the canister.

According to another aspect of the disclosure, the nozzle opening has an essentially circular cross-sectional shape and that the inner wall of the first fluid passage has an essentially circular cross-sectional shape, so that the flow of air in the first fluid passage has an essentially annular cross-sectional shape when flowing around the nozzle opening in a direction along the first fluid passage from the engine flow port towards the air channel flow port. The annular shape of the flow will further increase the efficiency of the purge ejector assembly, so the fuel vapors are efficiently purged from the canister.

According to an aspect of the disclosure, the flow shape unit comprises a converging part, configured to raise the flow velocity of the flow of air from the engine flow port to the air channel flow port. The converging part is used for establishing the low pressure level in the second fluid passage when the velocity of air in the first fluid passage is raised.

According to a further aspect of the disclosure, the converging part is formed by an end portion of the second fluid passage extending into the first fluid passage. In this way, the end portion of the second fluid passage is used for establishing the converging part, which provides a simple and reliable construction.

According to another aspect of the disclosure, the converging part is formed by a pipe contraction within the first fluid passage. This provides an alternative way to construct the converging part, which provides flexibility in the shaping of the flow of air around the nozzle opening.

According to further aspects of the disclosure, the flow shape unit comprises a diverging part arranged in the flow direction after the converging part, where the diverging part can be formed by a pipe expansion within the first fluid passage. The diverging part establishes an efficient flow through the purge ejector assembly in order to purge the fuel vapor from the canister.

According to an aspect of the disclosure, the purge ejector assembly further comprises a first valve disposed in the first fluid passage at a position in-between the engine flow port and the flow shape unit, where the first valve is configured to permit fluid to flow through the first valve from the engine flow port towards the flow shape unit, while restricting fluid to flow through the first valve from the flow shape unit towards the engine flow port. A second valve is disposed in the second fluid passage and configured to permit fluid to flow through the second valve from the purge flow port towards the air channel flow port, while restricting fluid to flow through the second valve from the air channel flow port towards the purge flow port. The arrangement and location of the first valve contributes to an undisturbed flow in the first fluid passage, thereby further improving the performance of the purge ejector assembly. It becomes possible to provide a purge ejector assembly contributing to empty the canister in an efficient manner, while fulfilling regulations as to exhaust and fuel emissions in a more satisfied manner.

According to another aspect of the disclosure, the purge ejector assembly further comprises a third fluid passage establishing fluid communication between the purge flow port and the engine flow port, and a third valve disposed in the third fluid passage at a position in-between the engine flow port and the purge flow port. The third valve is configured to permit fluid to flow through the third valve from the purge flow port towards the engine flow port, while restricting fluid to flow through the third valve from the engine flow port towards the purge flow port, thereby enabling evaporated fuel to flow in the third fluid passage from the canister purge passage to the engine flow port when a low pressure is applied to the engine flow port. The arrangements and locations of the first valve, the second valve and the third valve allow for determining and controlling the purge flow in both low pressure conditions and boost pressure conditions. In this way, the canister can be purged in different driving situations of the vehicle.

According to a further aspect of the disclosure, the purge ejector assembly is an assembled single unit. With a single unit, the purge ejector assembly is easy to install in the vehicle, also in known or commercially available vehicles without substantial changes to the fuel system or the EVAP system, while enabling an effective purge of the canister during operation of the engine system.

The disclosure further concerns a fuel tank for storing fuel, a canister for absorbing evaporated fuel emitted from the fuel tank and adapted to desorb the evaporated fuel, the canister being connected to the fuel tank via an evaporation vent passage, and a canister purge passage extending from the canister to an engine inlet manifold. A purge valve is disposed in the canister purge passage and configured to regulate the flow of evaporated fuel in the canister purge passage. The system further comprises a purge ejector assembly as described above.

The disclosure also relates to a method for ejecting evaporated fuel in a vehicle with a purge ejector assembly, where a flow of air is disposed in a first fluid passage of the purge ejector assembly around an nozzle opening, where the nozzle opening is arranged inside the first fluid passage such that the flow of air in the first fluid passage is flowing around the nozzle opening. Further, the disclosure relates to a vehicle comprising a purge ejector assembly.

The term connected typically means that a component is in operative relation to another component, either directly or indirectly. The term fuel as used herein typically refers to petrol or gasoline, although the fuel may also refer to diesel or any other fuel types suitable for vehicle engines.

Although the disclosure will be described in relation to a car, the disclosure is not restricted to this particular vehicle, but may also be used in other type of vehicles such as for example trucks, buses, construction equipment, industrial construction machines, and wheel loaders.

BRIEF DESCRIPTION OF THE DRAWINGS

The disclosure will be described in greater detail in the following, with reference to the attached drawings, in which.

DETAILED DESCRIPTION OF EXAMPLE EMBODIMENTS OF THE INVENTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

FIGS. 1-4 schematically show a fuel evaporation purge system 102 to be installed in a vehicle, such as for example a car. The fuel evaporation purge system 102 comprises a purge ejector assembly 10, and the fuel evaporation purge system 102 is typically part of a vehicle fuel system 100. The purge ejector assembly 10 is described in further detail below with reference to FIGS. 3-4 and 5A-B. The vehicle may for example be a car. However, the fuel evaporation purge system may also be installed and arranged in other types of vehicles.

Figure 1:
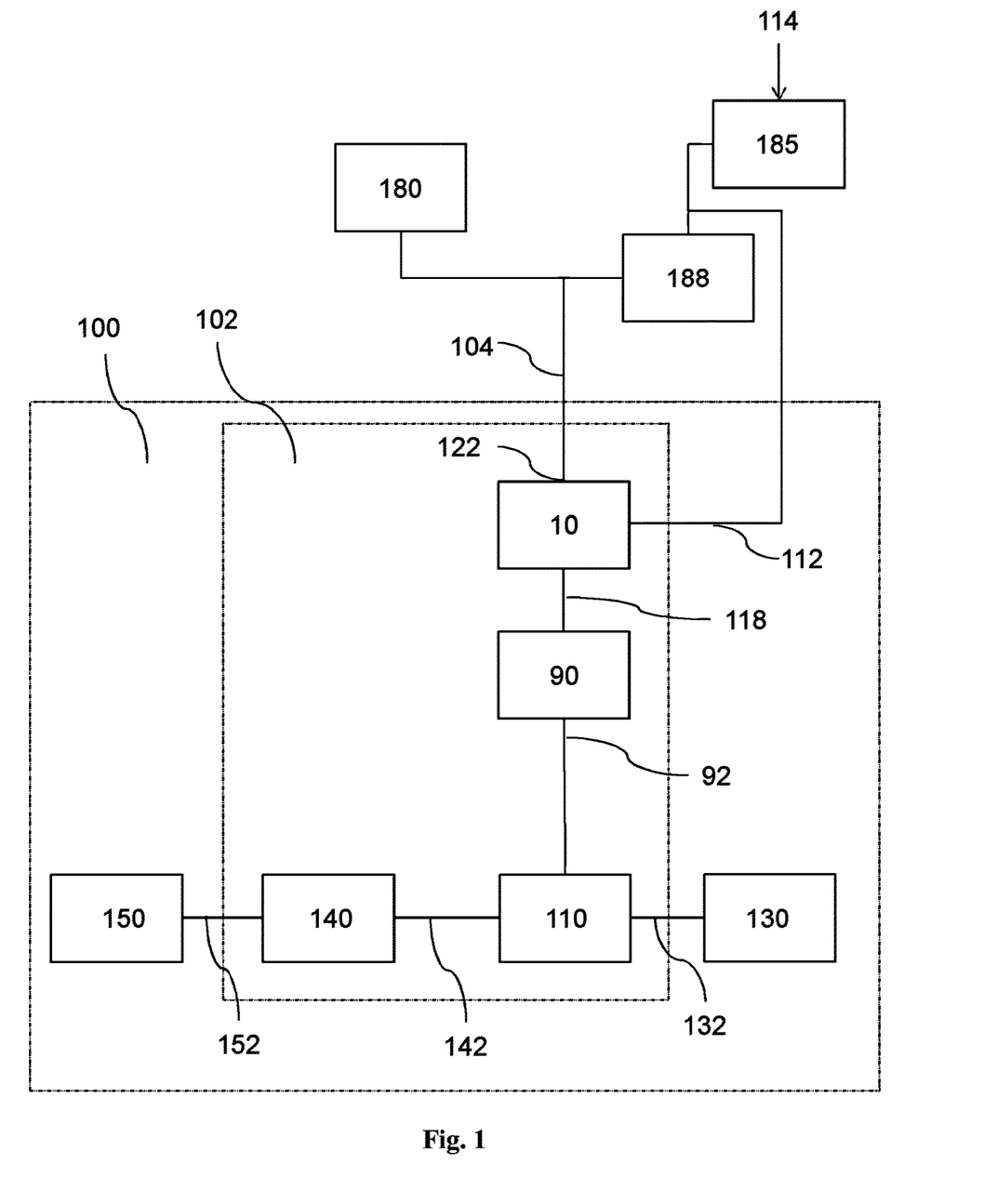
FIG. 1 shows schematically, an example embodiment of a fuel system including a purge ejector assembly according to the disclosure, wherein the purge ejector assembly is part of a fuel evaporation purge system.

In FIG. 1, the vehicle fuel system 100 is schematically shown. The vehicle fuel system may also be denoted as the fuel system 100. Similarly, the vehicle fuel evaporation purge system 102 may also be denoted as the evaporation purge system, the evaporative emission control system, or simply as the EVAP system. The fuel evaporation purge system 102 is typically, although strictly not necessary, a part of the fuel system.

The fuel system 100, including the EVAP system, is in this example embodiment connected to an engine or engine system 180 of the vehicle. The engine system 180 includes the engine of the vehicle, and the engine comprises one or more cylinders. Moreover, the engine system 180 has an engine inlet manifold 104, also known as manifold or intake, and an engine exhaust. Generally, the engine inlet manifold 104 has a throttle that is in fluid communication with the engine inlet manifold 104. The engine exhaust may include an exhaust manifold connected to an exhaust passage configured to direct exhaust gas to the atmosphere. These components of the engine system 180 as well as their functions and configurations in the engine system 180 are well-known in the art, and therefore not further described.

The fuel system 100 is connected to an air intake unit 185 such as an air filter unit or similar arrangement, which is adapted to receive fresh air from the outside 114, as shown in FIG. 1. The air intake unit 185 is in this example positioned upstream the engine inlet manifold 104. In addition, this type of vehicle system may also include a compressor 188 such as for example a turbocharger, supercharger or the like. The compressor 188 is configured to operate as a boosting device during boost pressure operating conditions of the engine. In this example, the compressor 188 is located or arranged in-between the engine system 180 and the air intake unit 185. Typically, the compressor 188 is arranged between the throttle located in the engine inlet manifold of the engine system 180 and the air intake unit 185. The compressor 188 may typically be configured to draw in intake air at atmospheric air pressure and boost the air to a higher pressure typically corresponding to a first pressure level P1, also denoted as a boost pressure.

By using the pressurized intake air, i.e. the boosted intake air, a boosted engine operation may be performed by the engine system 180. The operation of the compressor 188 to obtain a suitable boost pressure may vary depending on type of vehicle and type of engine. In addition, the arrangement, components and functions of the air intake unit 185 and the compressor 188 in view of the engine system 180 may vary depending on type of vehicle, type of engine system and type of fuel system. As these components and their functions are well-known in the art and selected depending on type of vehicle and type system, no further details are described herein.

The fuel system 100 includes a fuel filter pipe 150 connected to a fuel tank 140 via a fuel filter pipe passage 152, as shown in FIG. 1. The fuel tank 140 is in this example adapted to store fuel, such as for example petrol. The fuel tank 140 may include or be connected to a fuel pump system adapted for delivering pressurized fuel delivered to the engine system 180, typically to one or a number of fuel injectors of the engine system 180. As mentioned above, the fuel system may typically include the fuel evaporation purge system 102, as shown in FIGS. 1 and 2.

Figure 2:
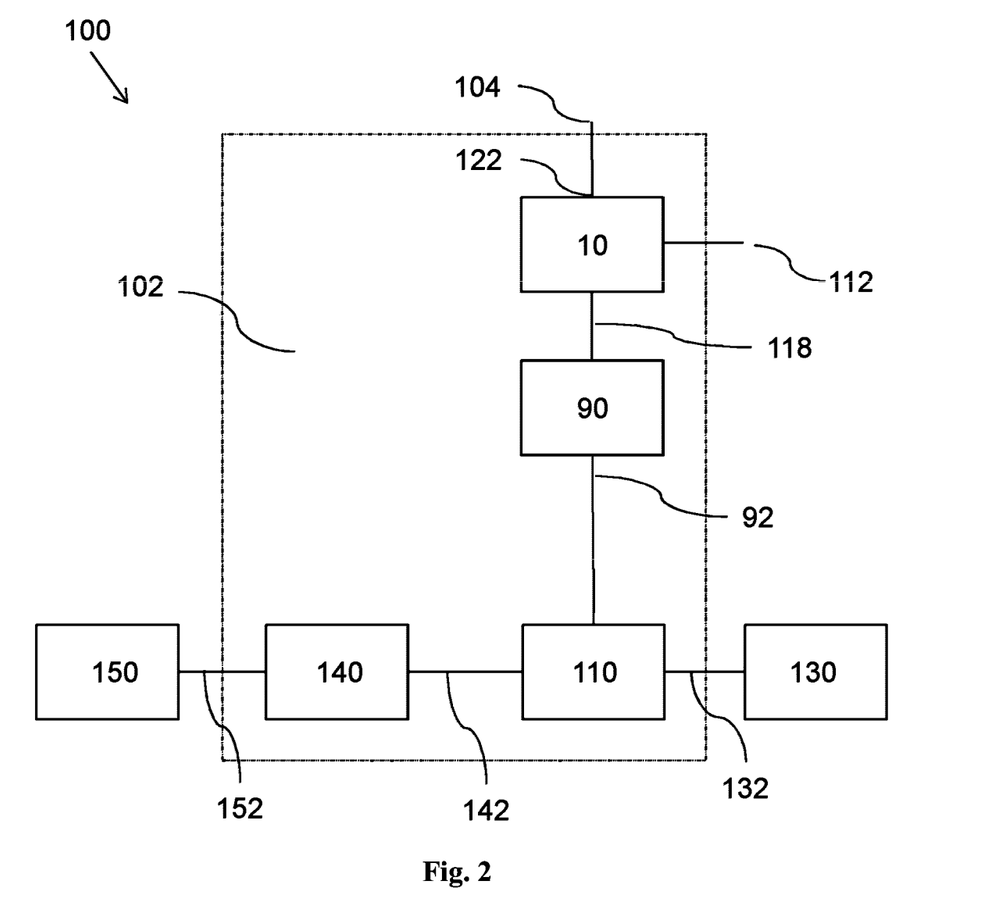
FIG. 2 shows schematically, an example embodiment of the fuel evaporation purge system in FIG. 1, including a purge ejector assembly according to the disclosure.

FIG. 2 shows a fuel evaporation purge system 102 according to example embodiments of the invention. In this example, the fuel evaporation purge system 102 comprises the fuel tank 140 for storing fuel. The EVAP system also includes a canister 110 for absorbing fuel vapors emitted from the fuel tank and adapted to desorb the evaporated fuel. In other words, the canister 110 is intended to function as a fuel vapor retaining device. The canister 110 is typically filled with an adsorbent capable of binding large quantities of vaporized hydrocarbons. The canister 110 may for example include an adsorbent in the form of activated charcoal.

As shown in FIG. 2, the canister 110 is connected to the fuel tank 140 via an evaporation vent passage 142. As such, the canister 110 can receive fuel vapors from the fuel tank 140 via the evaporation vent passage 142. In some examples, the EVAP system may include one single canister 110. However, in other examples, the EVAP system may include a number of inter-connected canisters. From the above, it should be understood that when fuel is filled into the fuel tank 140, fuel vapors from the fuel tank 140 can be vented via the evaporation vent passage 142 to the canister 110 in order to avoid that hydrocarbons are released into the environment.

The EVAP system may be connected to an air filter 130 via an air filter ventilation passage 132. The air filter 130 permits the canister 110 to communicate with the surrounding atmosphere via the air filter ventilation passage 132. It should be readily appreciated that the canister 110 may be controlled in various ways depending on the type of vehicle, type of EVAP system and type of canister 110. As an example, the canister 110 may be controlled by one or several canister vent solenoids, as is well-known in the art.

As shown in FIG. 2, a canister purge passage 92 extends from the canister 110 to the engine inlet manifold 104. As will be further described below, the canister 110 needs to be drained of hydrocarbons to make sure that the emissions are kept to a satisfied level. Therefore, the EVAP system typically may comprise a purge valve 90 disposed in the canister purge passage 92. The purge valve 90 is configured to regulate the flow of evaporated fuel in the canister purge passage 92. By opening the purge valve, the hydrocarbons contained in the canister can be transferred to the engine system 180 and subsequently combusted in the engine.

The purge valve 90 may for instance be operated by software and set to open and close on the basis of the duty cycle of a solenoid connected to the purge valve 90. For instance, the purge valve 90 may be set to a closed state so that no fuel vapors are purged via the canister purge passage 92. In contrast, when the purge valve 90 is set to an open state, it becomes possible to purge fuel vapors from the canister 110. The purge valve 90 may be a conventional check valve, a solenoid or the like. Further, as mentioned above, the evaporation fuel purge system 102 comprises the purge ejector assembly 10 according to various example embodiments described herein.

As shown in FIGS. 1 and 2, the purge ejector assembly 10 is disposed at a position in the canister purge passage 92 between the purge valve 90 and the engine inlet manifold 104. However, it should be appreciated that the purge ejector assembly 10 may be installed in other locations of the EVAP system and/or the canister purge passage 92. In other words, the canister purge passage 92 is connected to the purge ejector assembly 10, which is then connected to the engine system 180 via the engine inlet manifold 104.

The purge ejector assembly 10 comprises an ejector pump of the vacuum ejector pump type, using the known Venturi effect to convert the pressure energy of a motive fluid to velocity energy, which creates a low pressure zone that draws in and entrains a suction fluid. The details of the purge ejector assembly 10 will be described more in detail below.

Figure 3:
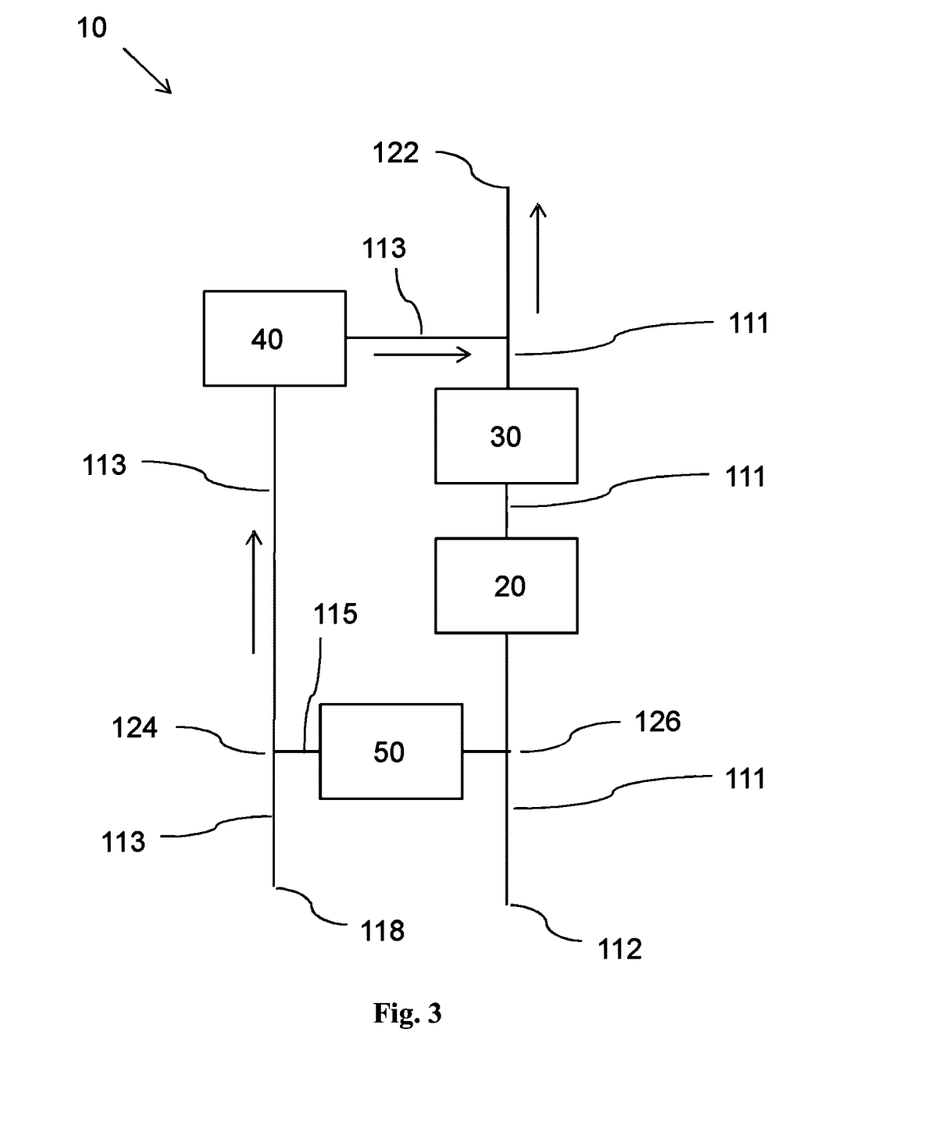
FIG. 3 shows schematically, a purge ejector assembly according to various example embodiments of the disclosure, in which the purge ejector assembly is operating under low pressure conditions.

FIG. 3 schematically shows the purge ejector assembly 10 according to an example embodiment, in which the purge ejector assembly 10 is subjected to a low pressure so that the purge ejector assembly 10 is set to operate under so called low pressure conditions. During low pressure conditions, the air and fuel mixture is sucked into the engine in the naturally aspirated mode of the engine, where the compressor 188 is not used.

Figure 4:
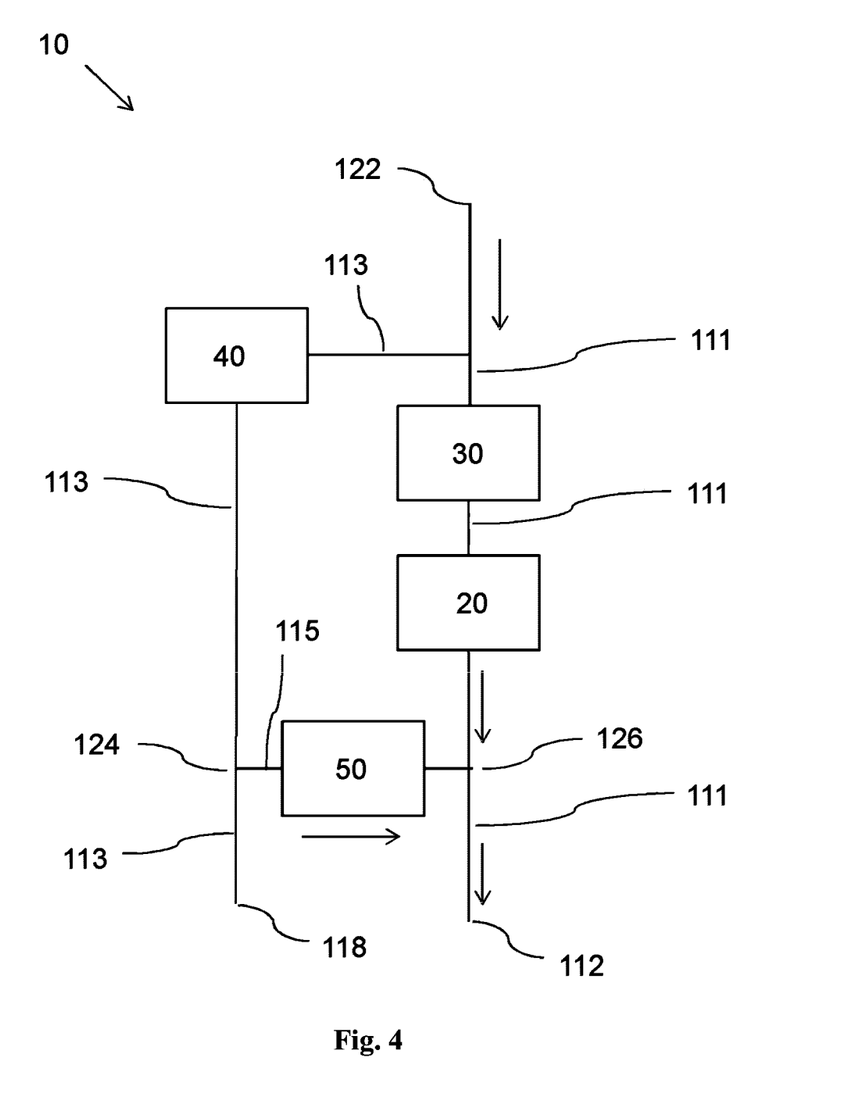
FIG. 4 shows schematically, a purge ejector assembly according to various example embodiments of the disclosure, in which the purge ejector assembly is operating under boost pressure conditions.

FIG. 4 schematically illustrates an example embodiment of the purge ejector assembly 10 in FIG. 3, in which the purge ejector assembly 10 is subjected to a boost pressure so that the purge ejector assembly 10 is set to operate under the so called boost pressure conditions, as described above.

The EVAP system 102 in FIGS. 3 and 4 comprises the purge ejector assembly 10, where the purge ejector assembly 10 may be provided as a single unit. However, the purge ejector assembly 10 may in other examples also be provided as separate components in the EVAP system, which components in combination are making up the purge ejector assembly 10.

Figure 5A:
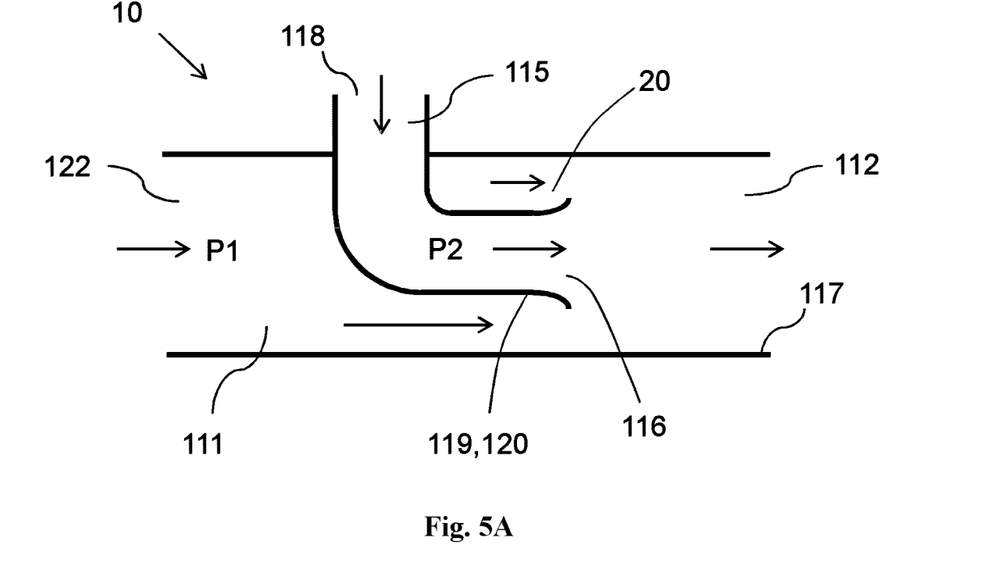
FIG. 5A-B show schematically, example embodiments of a purge ejector assembly according to the present disclosure.

As shown in FIG. 5A, the purge ejector assembly 10 comprises a first fluid passage 111 having an engine flow port 122 and an air channel flow port 112 in fluid communication with each other. The first fluid passage 111 is adapted to transport fluids, such as air and fuel vapors, and unless the first fluid passage 111 is restricted by a valve as mentioned below, the first fluid passage 111 is capable of transporting fluids in both directions between the engine flow port 122 and air channel flow port 112. The first fluid passage 111 is arranged for guiding a stream of pressurized air from the compressor 188, which is flowing from the engine flow port 122 in a direction towards the air channel flow port 112. The first fluid passage 111 may be arranged as a pipe structure in which the pressurized air is flowing. The engine flow port 122 is arranged to be in fluid communication with the compressor 188 via the engine inlet manifold 104. In this way, a part of the pressurized air from the compressor 188 is guided through the engine inlet manifold 104 and further through the first fluid passage 111. The air channel flow port 112 is arranged to be in fluid communication with an air inlet channel arranged between the air intake unit 185 and the compressor 188, as shown in FIG. 1, so that the flow of air through the first fluid passage 111 may flow back to the inlet of the compressor 188. The air intake unit 185 may as described above typically be connected to the compressor 188. However, this example is only one of many possible examples of a fluid connection between the various components of the system. The flow of air in the first fluid passage 111 may be regarded as the motive fluid in the purge ejector assembly 10 having a first pressure level P1, essentially corresponding to the boost pressure from the compressor 188.

A second fluid passage 115 is connected to the first fluid passage 111. The second fluid passage 115 has a purge flow port 118 arranged outside the first fluid passage 111 and a nozzle opening 116, where the purge flow port 118 and the air channel flow port 112 are in fluid communication with each other. The second fluid passage 115 is arranged for guiding a stream of fuel vapor, which is flowing in a direction from the purge flow port 118 through the nozzle opening 116 towards the air channel flow port 112. The second fluid passage 115 may be arranged as a pipe structure in which the evaporated fuel is flowing. The purge flow port 118 is connectable to the canister purge passage 92 enabling evaporated fuel to flow in the second fluid passage 115 from the canister purge passage 92 via the purge flow port 118 to the air channel flow port 112. The air channel flow port 112 is as described above arranged to be in fluid communication with the air inlet channel arranged between the air intake unit 185 and the compressor 188, as shown in FIG. 1, so that the flow of fuel vapor through the second fluid passage 115 may flow to the inlet of the compressor 188. The second fluid passage 115 is thus arranged for evacuating or purging evaporated fuel from the canister 110 via the canister purge passage 92.

The flow of air in the first fluid passage 111 is mixed with the flow of fuel vapor from the second fluid passage 115 after the nozzle opening 116. The mixing of the flow of air and the flow of fuel vapor will thus take place within the first fluid passage and be further transported through the air channel flow port 112.

A flow shape unit 20 is disposed within the first fluid passage 111 between the engine flow port 122 and the air channel flow port 112, and the flow shape unit 20 is configured to raise the flow velocity of air flowing in a direction from the engine flow port 122 to the air channel flow port 112 when the first pressure level P1 is applied to the engine flow port 122 during boost pressure conditions upon operation of the compressor 188, thereby subjecting the second fluid passage 115 to a second pressure level P2, which second pressure level P2 due to the Venturi effect is lower than the first pressure level P1. This effect is well known in the art and is commonly used in different ejector applications. The system is designed so that under boost pressure, the second pressure level P2 is lower than the pressure level in the canister 110 and in the canister purge passage 92, and in this way the fuel vapor is sucked from the canister 110, via the canister purge passage 92 through the second fluid passage 115. The flow of fuel vapor in the second fluid passage 111 may be regarded as a suction fluid in the purge ejector assembly 10 having the second pressure level P2. The first pressure level P1 may vary in the system depending on the pressure output from the compressor 188. The purge ejector assembly 10 may be based on system parameters be designed so that a suitable second pressure level P2 is achieved during boost pressure conditions.

The second fluid passage 115 is extending into the first fluid passage 111 so that the nozzle opening 116 is arranged inside the first fluid passage 111 facing the air channel flow port 112 such that the flow of air in the first fluid passage 111 is flowing around the nozzle opening 116. As shown in FIG. 5A, the flow shape unit 20 is disposed within the first fluid passage 111 in connection to the nozzle opening 116.

The flow of air in the first fluid passage 111 is flowing around the nozzle opening 116 along an inner wall 117 of the first fluid passage 111. The nozzle opening 116 has an essentially circular cross-sectional shape and the inner wall 117 of the first fluid passage 111 has an essentially circular cross-sectional shape. In this way, the flow of air in the first fluid passage 111 may be arranged so that it has an essentially annular cross-sectional shape when flowing around the nozzle opening 116, in a direction along the first fluid passage 111 from the engine flow port 122 towards the air channel flow port 112. Tests have shown that the flow of air with annular cross-sectional shape around the nozzle opening 116 establishes a highly efficient suction effect in the second fluid passage 115. In this way the canister 100 may be purged in an efficient way with low energy consumption with this specific design of the purge ejector assembly 10. Low energy usage in the purge ejector assembly 10 is important in order to support the lowering of the total emissions of the vehicle.

The flow shape unit 20 comprises a converging part 119, which is configured to raise the flow velocity of the flow of air from the engine flow port 122 to the air channel flow port 112. As shown in FIG. 5A, the converging part 119 may be formed by an end portion 120 of the second fluid passage 115 extending into the first fluid passage 111. Due to the pipe-like configuration of the second fluid passage 115, the end portion 120 may as an example be funnel-shaped in order to form the converging part 119, as shown in FIG. 5A, where the end portion 120 forming the nozzle opening 116 in a cross-sectional view is widened in a curve towards the inner wall 117 of the first fluid passage 111.

When the purge ejector assembly 10 is operated under boost pressure conditions, air is flowing from the compressor 188 through the engine inlet manifold and further into the engine flow port 122 of the first fluid passage 111, as shown in FIGS. 1 and 4. As described above, the boost pressure is establishing the flow of air with the first pressure level P1 in the first fluid passage 111, and the air flow entering the first fluid passage 111 is the motive fluid that is operating the purge ejector assembly 10 under boost pressure conditions. When the air flow is reaching the flow shape unit 20, the velocity of the air flow increases and due to this effect the second pressure level P2 is established in the second fluid passage 115. In this way, the evaporated fuel can be purged from the canister 110 and flow through the canister purge passage 92 and further into the purge flow port 118 of the second fluid passage 115. The flow of evaporated fuel will exit the second fluid passage when reaching the nozzle opening 116, and after the nozzle opening 116, the flow of air in the first fluid passage 111 will mix with the fuel vapor from the second fluid passage 115, and the mixed fluids will flow out from the first fluid passage 111 through the air channel flow port 112 and further to the air inlet channel arranged between the air intake unit 185 and the compressor 188. The flow of air is thus disposed in the first fluid passage 111 of the purge ejector assembly 10 around the nozzle opening 116, where the nozzle opening 116 is arranged inside the first fluid passage 111 such that the flow of air in the first fluid passage 111 is flowing around the nozzle opening 116. The mixed fluids will be drawn into the compressor 188 and be part of the flow of air from the compressor 188. The main part of the air flow from the compressor 188 is boosted into the engine, and the evaporated fuel from the canister is thus burned in the engine. It should be noted that the total amount of evaporated fuel in the air flow from the compressor 188 is very low compared to the amount of air, and this small amount of fuel vapor will not affect the performance of the engine and other systems in a negative way. It should be understood that the air flow from the compressor 188 entering the first fluid passage 111 also may contain small amounts of evaporated fuel.

Figure 5B:
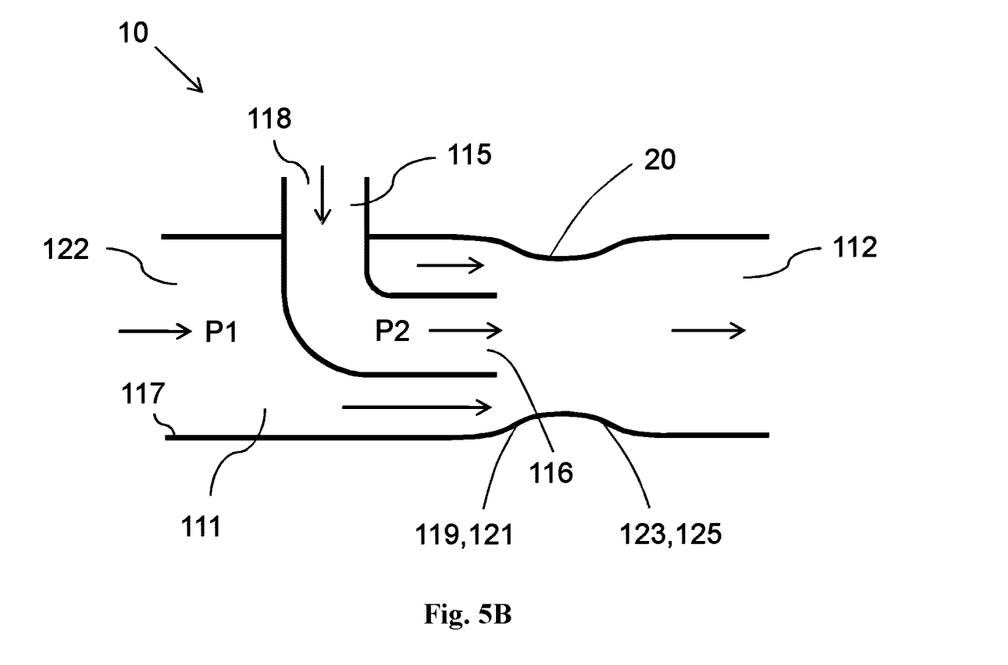

In FIG. 5B, an alternative embodiment of the purge ejector assembly is shown, where the converging part 119 is formed by a pipe contraction 121 within the first fluid passage 111. Further, the flow shape unit 20 may also comprise a diverging part 123 arranged in the flow direction after the converging part 119, as shown in FIG. 5B. The diverging part 123 may be formed by a pipe expansion 125 within the first fluid passage 111. The converging part 119 and the diverging part 123 are in a conventional way used to control the flow in the first fluid passage. The pipe contraction 121 may for example be formed through shaping of the inner wall 117 of the first fluid passage 111, as shown in FIG. 5B. The fluid passage 111 may thus simply in the forming process be shaped into the desired configuration so that the pipe contraction 121 is part of the wall structure of the first fluid passage. In the same way, the pipe extension 125 may also be formed through shaping of the inner wall 117 of the first fluid passage 111. As an alternative, the pipe contraction 121 and the pipe expansion 125 may be formed of a separate piece of material, which is inserted into the first fluid passage 111.

The purge ejector assembly 10 may further comprise a first valve 30 disposed in the first fluid passage 111 at a position in-between the engine flow port 122 and the flow shape unit 20, as shown in FIGS. 3 and 4. The first valve 30 is configured to permit fluid to flow through the first valve 30 from the engine flow port 122 towards the flow shape unit 20, while restricting fluid to flow through the first valve from the flow shape unit 20 towards the engine flow port 122. A second valve 50 may be disposed in the second fluid passage 115. The second valve 50 is configured to permit fluid to flow through the second valve 50 from the purge flow port 118 towards the air channel flow port 112, while restricting fluid to flow through the second valve 50 from the air channel flow port 112 towards the purge flow port 118.

As shown in FIGS. 3 and 4, the second fluid passage 115 is establishing fluid communication between the purge flow port 118 and the air channel flow port 112. The second fluid passage 115 extends from a second fluid passage position 124 located between the purge flow port 118 and a third valve 40 to a first fluid passage position 126 located between the flow shape unit 20 and the air channel flow port 112. In this example, the second fluid passage position 124 is located at a junction of a third fluid passage 113 and the second fluid passage 115. Further, the first fluid passage position 126 is located at a junction of the first fluid passage 111 and the second fluid passage 115.

The second valve 50 is disposed in the second fluid passage 115. The second valve 50 is configured to permit fluid to flow through the second valve 50 in a direction from the purge flow port 118 toward the air channel flow port 112, while restricting fluid to flow through the second valve 50 in a direction from the air channel flow port 112 toward the purge flow port 118. Hereby, evaporated fuel is permitted to flow in the second fluid passage 115 from the canister purge passage 92, via the purge flow port 118 to the air channel flow port 112 when the purge ejector assembly 10 is subjected to a boost pressure via the engine flow port 122. The first pressure level P1 affecting the assembly 10 forms the second pressure level P2 in the second fluid passage 115. In other words, due to the configuration of the assembly, in particular the first valve 30 and the flow shape unit 20, the first pressure level P1 is generated by the compressor 188 in the first fluid passage 111 so that the second fluid passage 115 extending between the purge flow port 118 and the air channel flow port 112, is subjected to the second pressure level P2, which is lower than the first pressure level P1 and also lower than the pressure level in the canister 110. The second pressure level P2 in the second fluid passage 115 enables the canister 110 to be emptied via the second fluid passage 115 to the air channel flow port 112 when the system is operating under boost pressure. In other words, the first pressure level P1 generated in the first fluid passage 111 by the compressor 188 is forming the lower second pressure level P2 in the second fluid passage 115.

The second valve 50 may be a check valve. Also, it is to be noted that unless the second fluid passage 115 is restricted by the second valve 50, the second fluid passage 115 is capable of transporting fluid in both directions between the purge flow port 118 and the air channel flow port 112.

As mentioned above, the second fluid passage 115 extends between the first fluid passage 111 and the third fluid passage 113. The second fluid passage 115 is establishing the fluid communication between the purge flow port 118 and the air channel flow port 112, and is connected to the purge flow port 118 via the third fluid passage 113 and further connected to the air channel flow port 112 via the first fluid passage 111. The second fluid passage 115 is thus connected to the first fluid passage 111 and the third fluid passage 113. Further, the second fluid passage 115 is connected to the third fluid passage 113 at a junction located between the purge flow port and the third valve 40, corresponding to the second fluid passage position 124, and connected to the first fluid passage at a junction between the flow shape unit 20 and the air channel flow port 112, corresponding to the first fluid passage position 126. The location of the second fluid passage position 124 in the third fluid passage 113 may also correspond to the purge flow port 118. Analogously, the location of the first fluid passage position 126 in the first fluid passage may also correspond to the air channel flow port 112.

The second fluid passage 115 and the second valve 50 are configured to restrict fluid to flow through the second valve 50 from the air channel flow port 112 toward the purge flow port 118.

When the compressor 188 operates in the boost mode to generate the boost pressure, which results in that the purge ejector assembly 10 is subjected to the first pressure level P1, air is flowing through the first fluid passage 111 in a direction from engine flow port 122 towards the air channel flow port 112. In other words, the air is flowing through the first valve 30 and through the flow shape unit 20 when the compressor operates in the boost mode. Hereby, the second pressure level P2 is created in the second fluid passage 115 due to the configuration of the flow shape unit 20. The second pressure level P2 enables fuel vapor purging during boosted engine conditions via the second fluid passage 115. The flow of air in the first fluid passage 111 during boosted engine conditions is indicated by arrows in FIG. 4. The flow of fuel vapor in the second fluid passage 115 during boosted engine conditions is indicated by an arrow in FIG. 4.

As described above, the purge ejector assembly 10 may also comprise the third fluid passage 113 establishing fluid communication between the purge flow port 118 and the engine flow port 122, as shown in FIGS. 3 and 4. The third valve 40 may be disposed in the third fluid passage 113 at a position in-between the engine flow port 122 and the purge flow port 118. The third valve 40 is configured to permit fluid to flow through the third valve 40 from the purge flow port 118 towards the engine flow port 122, while restricting fluid to flow through the third valve 40 from the engine flow port 122 towards the purge flow port 118, thereby enabling evaporated fuel to flow in the third fluid passage 113 from the canister purge passage 92 to the engine flow port 122 when a low pressure is applied to the engine flow port 122.

The purge flow port 118 is connectable to the canister purge passage 92. As shown in the figures, the third fluid passage 113 is connected to the engine flow port 122 at a junction in the first fluid passage 111 located between the engine flow port 122 and the first valve 30. The third valve 40 is disposed in the third fluid passage 113 at a position in-between the engine flow port 122 and the purge flow port 118. Further, the third valve 40 is configured to permit fluid to flow through the third valve 40 from the purge flow port 118 toward the engine flow port 122, while restricting fluid to flow through the third valve 40 from the engine flow port 122 toward the purge flow port 118. Hereby, evaporated fuel is permitted to flow in the third fluid passage 113 from the canister purge passage 92 to the engine flow port 122 when the assembly 10 is operating under low pressure conditions via the engine flow port 122. The third valve 40 may for example be a check valve. Also, it should be noted that unless the third fluid passage 113 is restricted by the third valve 40, the third fluid passage 113 is capable of transporting fluid in both directions between the engine flow port 122 and the purge flow port 118.

The third fluid passage 113 is establishing the fluid communication between the purge flow port 118 and the engine flow port 122, and the third fluid passage 113 is connected to the engine flow port 122 via the first fluid passage 111. In this way, the third fluid passage 113 is connected to the first fluid passage 111. The third fluid passage 113 may be connected to the first fluid passage 111 at a junction located between the first check valve 30 and the engine flow port 122. However, as an alternative, the third fluid passage 113 establishing the fluid communication between the purge flow port 118 and the engine flow port 122 may instead be directly and independently connected to the engine inlet manifold 104.

It should also be noted that no fluid is capable of flowing through the third valve 40 in the third fluid passage 113 during boosted engine conditions, where the purge ejector assembly 10 is subjected to the boost pressure, since the third valve 40 is configured to restrict fluid to flow through the third valve 40 from the engine flow port 122 toward the purge flow port 118.

When the purge ejector assembly is subjected to the low pressure, as shown in FIG. 3, the third valve 40 is configured to permit fluid to flow through the third valve 40 from the purge flow port 118 toward the engine flow port 122. Thereby, the canister 110 can be purged via the canister purge passage 92 and the purge ejector assembly 10 to the engine system 180 during low pressure engine conditions. It will also be readily understood by the above configuration of the first fluid passage 111 and the first valve 30, that fuel vapor is restricted to flow through the first valve 30 in this mode because the first valve 30 is configured to restrict fluid to flow through the first valve 30 from the flow shape unit 20 toward the engine flow port 122.

Further, as shown in FIGS. 3 and 4, the purge ejector assembly 10 comprises the first valve 30 disposed in the first fluid passage 111 at a position in-between the engine flow port 122 and the flow shape unit 20. The first valve 30 is configured to permit fluid to flow through the first valve 30 from the engine flow port 122 toward the flow shape unit 20 and the air channel flow port 112, while restricting fluid to flow through the first valve from the flow shape unit 20 toward the engine flow port 122. The first valve 30 may as an example be a check valve controlling the flow through the first passage 111.

From the above description of the example embodiments of the purge ejector assembly 10, the purge ejector assembly 10 provides the possibility of purging the canister under various conditions, i.e. both during boosted engine conditions and low pressure conditions. In this manner, it becomes possible to further improve existing operations of the fuel system and the EVAP system. In particular, the present disclosure provides a purge ejector assembly 10 capable of controlling the purge flow both when the engine is operated under low pressure and under boost pressure conditions. As such, the example embodiments of the present invention improve the general performance of the purge ejector assembly.

The purge ejector assembly 10 may be constructed as a separate single unit which is mounted within the fuel system of the vehicle. In this way, the functions of the purge ejector assembly 10 may be integrated within one single unit. Such a single unit may be an assembled single unit, which is formed of different parts, including necessary flow channels and valves. The fluid passages and the flow shape unit may be constructed of any suitable material, such as for example plastic materials, composite materials and metals.

As shown in FIGS. 1 and 2, the air channel flow port 112 of the purge ejector assembly 10 is typically connected to the air inlet channel at a position between the air intake unit 185 and the compressor 188. However, it should also be readily understood that the purge ejector assembly can be installed in other ways and at other locations in an evaporation fuel purge system. For example, the purge ejector assembly 10 may be connected to the air inlet channel at a position downstream of compressor 188 but directly to the air intake unit 185, or at least adjacent the air intake unit 185.

It would also be possible to use another source for the pressurized air than a compressor in the form of a turbocharger or supercharger, depending on the engine construction. Other types of compressor units may be used instead in order to establish the motive fluid to the purge ejector assembly.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

| 10 | Purge ejector assembly | 20 | Flow shape unit |
| 30 | First valve | 40 | Third valve |
| 50 | Second valve | 90 | Purge valve |
| 92 | Canister purge passage | 100 | Vehicle fuel system |
| 102 | Fuel evaporation purge system | 104 | Engine inlet manifold |
| 110 | Canister | 11 | First fluid passage |
| 112 | Air channel flow port | 113 | Third fluid passage |
| 114 | Fresh air | 115 | Second fluid passage |
| 116 | Nozzle opening | 117 | Inner wall |
| 118 | Purge flow port | 119 | Converging part |
| 120 | End portion | 121 | Pipe contraction |
| 122 | Engine flow port | 123 | Diverging part |
| 124 | Second fluid passage position | 125 | Pipe expansion |
| 126 | First fluid passage position | 130 | Air filter |
| 132 | Air filter ventilation passage | 140 | Fuel tank |
| 142 | Evaporation vent passage | 150 | Fuel filter |
| 152 | Fuel filter passage | 180 | Engine system |
| 185 | Air intake unit | 188 | Compressor |

The invention claimed is:

1. A purge ejector assembly for a vehicle, comprising:
a first fluid passage having an engine flow port and an air channel flow port in fluid communication with each other;
a second fluid passage connected to the first fluid passage, the second fluid passage having a purge flow port arranged outside the first fluid passage and a nozzle opening, where the purge flow port and the air channel flow port are in fluid communication with each other, wherein the purge flow port is configured for connection to a canister purge passage so that evaporated fuel flows in the second fluid passage from the canister purge passage via the purge flow port to the air channel flow port;
a flow shape unit disposed within the first fluid passage between the engine flow port and the air channel flow port, where the flow shape unit is configured to raise the flow velocity of air flowing in a direction from the engine flow port to the air channel flow port when a first pressure level is applied to the engine flow port, so as to subject the second fluid passage to a second pressure level that is lower than the first pressure level;

wherein the second fluid passage extends into the first fluid passage and the nozzle opening is arranged inside the first fluid passage facing the air channel flow port such that the flow of air in the first fluid passage flows through a cross-sectional area surrounding the nozzle opening between the nozzle opening and an inner wall of the first fluid passage, and the flow shape unit is disposed within the first fluid passage in connection to the nozzle opening.

2. A purge ejector assembly according to claim 1,
wherein the nozzle opening has an essentially circular cross-sectional shape and wherein the inner wall of the first fluid passage has an essentially circular cross-sectional shape, so that the flow of air in the first fluid passage has an essentially annular cross-sectional shape when flowing around the nozzle opening in a direction along the first fluid passage from the engine flow port towards the air channel flow port.

3. A purge ejector assembly according to claim 1,
wherein the flow shape unit comprises a converging part, configured to raise the flow velocity of the flow of air from the engine flow port to the air channel flow port.

4. A purge ejector assembly according to claim 3,
wherein the converging part is formed by an end portion of the second fluid passage extending into the first fluid passage.

5. A purge ejector assembly according to claim 3,
wherein the converging part is formed by a pipe contraction within the first fluid passage.

6. A purge ejector assembly according to claim 3,
wherein the flow shape unit comprises a diverging part arranged in the flow direction after the converging part.

7. A purge ejector assembly according to claim 6,
wherein the diverging part is formed by a pipe expansion within the first fluid passage.

8. A purge ejector assembly according to claim 1,
wherein the purge ejector assembly further comprises:
a first valve disposed in the first fluid passage at a position in-between the engine flow port and the flow shape unit, the first valve being configured to permit fluid to flow through the first valve from the engine flow port towards the flow shape unit, while restricting fluid to flow through the first valve from the flow shape unit towards the engine flow port;
a second valve disposed in the second fluid passage and configured to permit fluid to flow through the second valve from the purge flow port towards the air channel flow port, while restricting fluid to flow through the second valve from the air channel flow port towards the purge flow port.

9. A purge ejector assembly according to claim 8,
wherein the purge ejector assembly further comprises:
a third fluid passage establishing fluid communication between the purge flow port and the engine flow port;
a third valve disposed in the third fluid passage at a position in-between the engine flow port and the purge flow port, the third valve being configured to permit fluid to flow through the third valve from the purge flow port towards the engine flow port, while restricting fluid to flow through the third valve from the engine flow port towards the purge flow port, enabling evaporated fuel to flow in the third fluid passage from the canister purge passage to the engine flow port when a low pressure is applied to the engine flow port.

10. A purge ejector assembly according to claim 1,
wherein the purge ejector assembly is an assembled single unit.

11. A fuel evaporation purge system comprising:
a fuel tank for storing fuel;
a canister for absorbing evaporated fuel emitted from the fuel tank and adapted to desorb the evaporated fuel, the canister being connected to the fuel tank via an evaporation vent passage;
a canister purge passage extending from the canister to an engine inlet manifold; and
a purge valve disposed in the canister purge passage and configured to regulate the flow of evaporated fuel in the canister purge passage;
wherein the system further comprises a purge ejector assembly according to claim 1, disposed between the purge valve and the engine inlet manifold.

12. A method for ejecting evaporated fuel in a vehicle with a purge ejector assembly according to claim 1, wherein the method comprises the step;
disposing a flow of air in a first fluid passage of the purge ejector assembly around an nozzle opening, where the nozzle opening is arranged inside the first fluid passage such that the flow of air in the first fluid passage is flowing around the nozzle opening.

13. A vehicle, wherein the vehicle comprises a purge ejector assembly according to claim 1.

14. A purge ejector assembly according to claim 1, wherein the second fluid passage has a portion inside the first fluid passage that extends parallel to the first fluid passage, the portion of the second fluid passage having a constant diameter along its length.

15. A purge ejector assembly according to claim 14, wherein the nozzle opening is a terminal end of the portion of the second fluid passage and has the same diameter as the portion of the second fluid passage.

16. A purge ejector assembly according to claim 14, wherein the nozzle opening is located at a terminal end of the portion of the second fluid passage and has a larger diameter than the portion of the second fluid passage.

17. A purge ejector assembly according to claim 16, wherein the nozzle opening relative to the portion of the second fluid passage and the first fluid passage is the flow shape unit configured to raise the flow velocity of the flow of air from the engine flow port to the air channel flow port.

* * * * *